United States Patent [19]

Bambrick et al.

[11] 4,411,771

[45] Oct. 25, 1983

[54] PROCESS FOR HYDROTREATING HEAVY HYDROCARBONS AND CATALYST USED IN SAID PROCESS

[75] Inventors: William E. Bambrick, Old Greenwich; Marvin S. Goldstein, Norwalk, both of Conn.

[73] Assignee: American Cyanamid Company, Stamford, Conn.

[21] Appl. No.: 325,699

[22] Filed: Nov. 30, 1981

Related U.S. Application Data

[63] Continuation-in-part of Ser. No. 209,776, Dec. 24, 1980, abandoned.

[51] Int. Cl.$^3$ .................. B01J 21/04; B01J 23/24; B01J 23/85
[52] U.S. Cl. ..................... 208/112; 208/216 PP; 208/251 H; 208/254 H; 502/8; 502/10; 502/323
[58] Field of Search ............. 252/448, 463, 465; 208/112, 216 PP, 251 H, 254 H; 423/628

[56] References Cited

U.S. PATENT DOCUMENTS

| | | | |
|---|---|---|---|
| 3,519,574 | 7/1970 | Colgan | 252/448 X |
| 3,923,646 | 12/1975 | Hilfman | 252/465 |
| 4,065,407 | 12/1977 | Bambrick | 423/628 X |
| 4,113,656 | 9/1978 | Riley et al. | 252/465 X |
| 4,120,826 | 10/1978 | Ebel et al. | 252/465 X |

*Primary Examiner*—W. J. Shine
*Attorney, Agent, or Firm*—Gordon L. Hart

[57] ABSTRACT

Spherical particles of alumina are prepared by agitating a slurry of solids comprising rehydratable alumina solids in water with a hot immiscible liquid to disperse droplets of the slurry in a continuous phase of the immiscible liquid. The droplets are shaped by interfacial surface tension and are hardened by heat while in the immiscible liquid, then are separated and calcined to produce finished spherical alumina beads. The preferred beads are of size less than one millimeter. These are used as supports for catalysts that are used in several oil refining processes such as hydrotreating for removal of sulfur or for reforming or cracking.

25 Claims, No Drawings

PROCESS FOR HYDROTREATING HEAVY HYDROCARBONS AND CATALYST USED IN SAID PROCESS

This application is a continuation-in-part of application Ser. No. 209,776, filed Dec. 24, 1980, now abandoned.

The invention relates to improvements in alumina particles useful as catalyst supports and improved methods of making such particles and to improved hydrotreating catalysts comprising such particles as catalyst supports.

The catalyst support particles of the invention are made from partially dehydrated, rehydratable alumina which has been prepared by flash calcining hydrated alumina such as Bayer process alumina. In the process of forming shaped alumina particles, the partially dehydrated alumina is rehydrated to set and harden the particles and then calcined to convert the alumina to essentially anhydrous alumina e.g. gamma and eta alumina. A process for preparing spherical bead-shaped particles of rehydrated alumina from an aqueous slurry of partially dehydrated alumina was described in U.S. Pat. No. 4,065,407. After the partially dehydrated alumina had been ground to powder and dispersed in water to make an aqueous slurry of about 50–60% solids, droplets of the aqueous slurry were introduced into a shaping medium in which the droplets were shaped and heated to rehydrate and harden the shaped alumina. In one embodiment, droplets were formed by forcing the slurry through an orifice from which droplets of the slurry fell into a hot oil bath in which the droplets were shaped to spherical form and hardened at a temperature suitable for rehydration. After curing in the hot oil bath for several hours to complete the rehydration, the spherical alumina beads were separated, dried and calcined to finish the alumina particles.

The earlier method that was described for introducing the droplets of the alumina slurry into the hot oil shaping and curing medium was quite suitable for making beads having average particle diameter from 1 to 5 mm but was limited by the ability of the slurry to pass through a tube or orifice of very small diameter. As a practical matter, for making beads smaller than about one millimeter in diameter, such technique is unsuitable because of low throughput rates per orifice. Additional difficulties include frequent clogging of the required small diameter orifices, and waste by particle aggregation on the surface of the hot oil bath. The earlier technique was better suited for making larger diameter beads, i.e. diameters from 1 mm to 5 mm.

We have improved the method by combining a volume of the aqueous alumina slurry with a larger volume of an immiscible hot oil and agitating the slurry and oil together with sufficient shearing force to disperse the aqueous slurry as tiny droplets in a continuous phase of the hot oil. When the aqueous slurry droplets are suspended in the immiscible oil phase, interfacial surface tension forces cause the droplets to be shaped into spherical beads. In the hot oil the beads are cured to at least partially rehydrate and harden the alumina. The average particle size of the beads is determined by the droplet size which is determined by the degree of agitation that is used to disperse the aqueous slurry droplets in the oil phase. A good yield of beads within a selected, rather narrow particle size range can be obtained by this method and the method is especially preferred for forming spherical beads of rehydratable alumina having diameters less than one millimeter in the range from 0.1 to one millimeter.

Dispersion of aqueous slurry droplets in the continuous oil phase can be accomplished by any of several agitating means, such as a rotary-blade agitating mixer for example. We prefer, however, to use an in-line motionless mixer which is located on line in a conduit just downstream from a point in the conduit at which separate streams of the immiscible aqueous slurry and oil components have been introduced in the proportions selected. Several different designs of motionless mixers are commercially available. An excellent description of several kinds of in-line motionless mixers is found in European Patent Application Publication No. 0 005 619. A combined stream of the two immiscible components is forced through a conduit to an in-line motionless mixer at sufficient linear velocity to provide a degree of shear, by agitation of the components in the mixer, sufficient to disperse the aqueous slurry droplets of desired size in the continuous oil phase as the liquids traverse the mixer. The two-phase dispersion is led from the in-line mixer into a relatively still bath of hot oil. The aqueous droplets in the hot oil bath settle gradually to the bottom as they are being held by interfacial tension in the desired spherical particle shape. The droplets harden rapidly in the hot oil by rehydration of alumina in the droplets. Thus the spherical shape of each formed particle is fixed by rehydration as the dispersed droplets cure in the hot oil.

An advantage of this method is that, with a given mixer, the average bead size can be varied within an available range of sizes by regulating the flow rate of the fluids through the mixer, and can be maintained at a selected size by controlling the flow rate. The bead size becomes smaller as the flow rate through the mixer is increased. Other factors affecting bead size are the mixer diameter, the number of mixing elements in the mixer, the ratio of slurry to oil and the viscosities, densities, and the interfacial surface tension characteristics of the selected fluids.

A suitable slurry of partially dehydrated, rehydratable alumina powder is prepared by mixing the powder with water. The rehydratable alumina powder preferably is one having loss on ignition at 650° C. (LOI) of about 7–15% and median particle diameter of 5–15 microns. It may contain 0.1 to 0.8% by weight $Na_2O$. Such powders may be prepared by flash calcining alumina hydrate, such as Bayer process alumina, as described in more detail in the earlier U.S. Pat. No. 4,065,407. If it is necessary to reduce the sodium content of the finished beads for a particular application, the soda can be readily leached either from the powder before bead formation or from the beads after they are formed. Soda level in the powder may be reduced by sodium leaching with cold water, dilute acids, or using ion exchange resin as was also described in the earlier patent. When soda has not been extracted from the powder, the slurry should preferably be neutralized with a small amount of acid. An aqueous slurry of the rehydratable alumina powder can be kept for several hours at low temperature (e.g. 15° C.) without significant effect on the eventual rehydrated bead product.

The concentration of alumina solids in a slurry for the present use is in the range from about 40% to about 60% by wt., and preferably from about 42 to 55% solids in the slurry. The total pore volume, density and strength of the finished alumina beads will be significantly affected by the solids concentration in the aqueous slurry. An advantage of this method is that the total pore volume, and the macropore volume (i.e. volume in pores having pore radius greater than 105 Angstroms) of the finished alumina beads can be varied within a range by varying the concentration of solids in the slurry, and a desired pore volume can be obtained by selection of the appropriate slurry concentration. To obtain large pore volume and low density, one selects a solid concentration value at the lower end of the range. The microporosity of the bead product, i.e. the pore volume in pores having pore radius less than 105 Angstrom, will be mostly unaffected by variation in the solids concentration of the slurry, and is generally in the range about 0.3–0.6 ml/g, while the macroporosity will be affected by changes in the solids concentration in the slurry. A preferred slurry having 47.5% solids is found to yield alumina beads having total pore volume of about 1 ml/gm with about 0.6 ml/gram pore volume in pores of the macroporous range, i.e. pore radius greater than 105 Angstrom.

For making spherical alumina beads of diameter less than one millimeter the present method is found to produce such beads effectively and with fewer mechanical difficulties, at higher production rates and with less waste than the prior art methods in which slurry droplets were introduced to the hot oil by dropping from orifice plates or hollow needles above a hot oil bath.

The in-line mixers that we prefer to use for dispersing slurry droplets in a continuous immiscible phase are available commercially in a variety of sizes. We have used Kenics brand in-line mixes. Essentially such a mixer is a tube that is lined inside with a series of several radial helical-blade stators fixed along the axis of the tube with the blade pitch of each stator opposed to the blade pitch of the adjacent stator next in line. A two phase liquid stream traversing the length of the mixer is directed by the opposed blades in constantly changing directions, causing intense shearing agitation which disperses the aqueous phase as droplets in the continuous oil phase. Other mixers may be used to disperse the aqueous phase in the oil.

For the two-component feed to the mixer we use a proportion of oil to aqueous phase always in excess of two volumes to one and preferably in the range from about 5 to about 20. The water-immiscible component is necessarily immiscible with the aqueous slurry. Other properties of the immiscible liquid such as viscosity, density and interfacial tension should be within ranges that will produce the desired slurry droplet size and shape. A variety of mineral oils have been successfully used. It is most convenient, if not necessary, to use the same oil component for the mixing step and for the hot oil bath in order not to change the composition of the oil bath as the dispersion is fed from the mixer to the bath. Also it is most convenient to preheat the oil component before it is introduced to the mixer in order to help maintain a desired operating temperature in the hot oil bath as the dispersion is fed from the mixer to the bath.

The preferred operating temperature for the hot oil curing bath is the highest temperature that can be maintained without boiling the water in the aqueous droplets, and we try to maintain the bath temperature at about 90°–95° C. At lower temperatures the hydration, and hence the hardening of the spherical beads will require more time.

The beads may be removed from the hot oil bath as soon as they have hardened sufficiently to hold their spherical shape, or they may be cured in the hot oil bath for time sufficient to complete the hydration. If the beads are removed before hydration is complete, a subsequent curing step using steam or hot water should be used.

The oil can be mostly removed from the beads by simple filtration or centrifugation or by using steam or hot water washes before calcining. Small amounts of residual oil will burn off during the calcining step which follows. If it is necessary to remove sodium ion, this can be done by leaching the spherical beads with water or dilute acid before or after calcining.

EXAMPLE 1

Flash calcined alumina powder having a median particle diameter of about 10 microns; loss on ignition (LOI) of 7.8%; rehydration index (RHI) of 63; and containing about 0.15% $Na_2O$ is slurried in dilute nitric acid in the ratio of 13.2 lbs. of rehydratable alumina/16 lbs. ice chips plus 24 lbs. water/76 ml concentrated $HNO_3$ (70%). The terms LOI and RHI are defined in U.S. Pat. No. 4,065,407. After 1.5 hours of leaching the alumina is separated by filtration and residual salts are washed out with deionized water. The filter cake containing about 57% solids is repulped in water using 20 lbs. of cake to about 3 lbs. of pure water to make slurry having solids content of 47.5%. The slurry is stored at 15° C. until used.

A mixture of one part mineral oil (Sontex ® 35) and one part polyterpene resin (Zonarez ® 7070) is heated to 95° and pumped through a 1" inside diameter Kenics 12-element static mixer at about 3 GPM. The aqueous slurry at about 15° C. is introduced at a rate of about 0.3 GPM to the oil stream at the inlet to the mixer and is dispersed as droplets with average diameter of about 500 microns in the oil phase during passage through the mixer. The conduit from the mixer leads directly to a bath of oil heated to 95° C. and of the same composition as the oil phase used for dispersing the droplets. The droplets rapidly harden as they cure in the bath. After curing in the hot oil bath for ½ hour, the beads are separated from the bulk of the oil by screening and exposed to a hydrothermal treatment in hot water. During this treatment, strength is improved, additional soda is removed, and adhering oil is rinsed from the surface of the beads. The beads are dried, calcined at 650° C. for 3 hours, and then screened to the desired mesh size. Screened yields from a typical sample were 50% 20–40 mesh, 6% +20 mesh, and 44% −40 mesh. The compacted bulk density (CBD) was 0.48 g/ml. The beads have a water pore volume of 0.99 ml/g. Pore size distribution, determined by mercury intrusion porosimetry is 0.96 ml/g total pore volume; 0.39 ml/g micropore volume and 0.57 ml/g macropore volume.

EXAMPLE 2

Beads are prepared substantially as described in Example 1 except that a different rehydratable alumina powder is used and the solids concentration in the slurry introduced to the Kenics mixer is varied in several runs as shown in Table I. In all cases, the finished alumina beads have a micropore volume as measured by mercury intrusion of 0.44–0.48 ml/g. This is a property deriving from the selected alumina powder. The total pore volumes varied as shown in Table I. Other similar preparations have been found to have micropore volumes substantially unaffected by solids concentration while substantially the same relationship between total pore volume and slurry solids concentration was found. This relationship is described approximately by the formula:

$$\text{Total pore volume in finished alumina beads (by mercury intrusion)} = 0.9 \left\{ \frac{100 - \% \text{ solids in slurry}}{\% \text{ solids in slurry}} \right\} \text{ml/g}$$

Thus, the total pore volume in the finished alumina beads, expressed as ml/g, is equal to approximately 90% of the volume of water (in ml) in the precursor slurry droplets, divided by the mass (in grams) of the alumina solids in the slurry droplets. Thus, the total pore volume can be controlled between about 0.75 and about 1.3 ml/g by controlling the slurry concentration between about 42% and 55% solids.

TABLE I

| % Solids in slurry | Total pore volume of finished alumina beads ml/g |
|---|---|
| 45.0 | 1.10 |
| 47.5 | 0.99 |
| 50.0 | 0.92 |

EXAMPLE 3

Beading slurry is prepared by mixing 6.77 kg of rehydratable alumina powder having a median particle size of 11.4 microns, 0.25% by wt $Na_2O$, and LOI of 10.2% with 3 kg of ice, 3 kg of water, and 85 ml of acetic acid. The slurry has specific gravity of 1.54 g/ml, solids content of 47.1% and viscosity of 17 seconds in a Zahn #2 cup.

The chilled slurry is introduced to an oil stream at the inlet to a 1" diameter×18-element Kenics in-line mixer in the ratio of 1 part by volume slurry to 10 parts of hot (95° C.) mineral oil (Sontex ® 35) at total flow rate of 2.2 gallons per minute. The mixture of slurry droplets in hot oil is collected in heated vessels and allowed to cure overnight at 90° C. Oil is spun off the beads in a perforated basket centrifuge after which the beads are calcined at 650° C. for two hours. Soda is now removed by washing in acidified water. The same procedure is repeated using various flow rates to demonstrate how bead size varies as a function of total flow rate through the static mixer; see Table II. Pore size distribution does not depend on the flow rate through the mixer. In all cases the total pore volume is about 1.0 ml/g, with about 0.42 ml/g in the micropores and about 0.58 ml/g in macropores.

TABLE II

Effect of Flow Rate on Median Particle Diameter

| Total Flow Rate Mineral Oil + Slurry, Gallons/Minute | Median Bead Diameter, Microns |
|---|---|
| 2.2 | 600 |
| 2.5 | 500 |
| 3.5 | 375 |
| 4.5 | 300 |

The pore volume and pore size characteristics of the beads of rehydrated and calcined alumina described above make them especially suitable for use as supports for catalysts used in a variety of processes for catalytic hydrotreating of hydrocarbon liquids. A number of processes have been described in which petroleum distillation fractions or residues or other hydrocarbons are contacted with hydrogen in presence of alumina supported catalysts under conditions suitable for hydrodesulfurization, or nitrogen compound removal, or removal of metals, or hydrocarbon conversions such as reforming or cracking, or for combinations of those functions. Most of such catalysts comprise at least one catalytic metal selected from group VI of the periodic table, usually molybdenum and may also contain at least one promoter metal from group VIII of the periodic table, usually cobalt or nickel. As catalyst support particles for such catalysts, spherical beads of the present invention offer several advantages. They can be readily made in very small and uniform particle sizes that are particularly suitable for use in upflow ebullated bed processes of the kind described for example in U.S. Pat. No. 3,622,500. The particle sizes and the pore size distributions described make these catalysts suitable for extended-life use in processes for hydrotreating heavy petroleum residues, as described for example in U.S. Pat. No. 3,630,888. In addition to catalytic hydrotreating of petroleum fractions or residues, the hydrotreating catalysts of this invention can be used for hydrotreating other hydrocarbon liquids, for example, coal-derived residues by the process described in U.S. Pat. No. 3,844,933 or other hydrocarbons derived from oil shale, tar sands and the like.

EXAMPLE 4

Catalyst beads are prepared by impregnating spheroidal alumina beads which have been shaped from slurry droplets of rehydratable alumina and hardened in a hot oil bath and then steam cured and calcined at 650° C. as described in Example 1 above. The 20/40 mesh screened fraction is used. For impregnating 1700 grams of these calcined support particles, an impregnating solution is prepared in two parts. The first part is prepared by dissolving 40 g. of citric acid in water, adding 116.4 g. of $Co(NO_3)_2.6H_2O$ and 116.4 g. of $Ni(NO_3)_2.6H_2O$. A second part is prepared by dissolving molybdenum oxide (grade L) in ammonium hydroxide aqueous solution to make a 1:1 molar ratio of $MoO_3:NH_4OH$ and a concentration of 0.232 g. $MoO_3$ per ml of solution. Just prior to impregnation the first part is combined with 1034 ml of the second part with stirring and the mixture is diluted with water to make 1785 ml of impregnating solution. This amount of solution is spray impregnated onto the 1700 g of beads. The damp beads are aged for 1–2 hours then dried and calcined at 650° C. for 1 hour. The calcined catalyst contains 1.5% CoO, 1.5% NiO and 12.8% $MoO_3$, by analysis. Measured water pore volume is 0.86 ml/g. The impregnated and calcined catalyst has macroporous pore volume as measured by mercury intrusion of 0.57 ml/g in macropores 105 Angstroms or greater radius and has microporous pore volume of 0.31 ml/g. The macroporous pore volume is relatively high by comparison with other hydrotreating catalysts and is particularly advantageous for hydrotreating heavy oil fractions.

This catalyst is calcined again at 450° C. for one hour then loaded into a trickle bed reactor of graded density using sand as diluent to help maintain an isothermal bed. The catalyst in the reactor is presulfided at 400° C. for 75 minutes using a 10% by volume gas solution of $H_2S$ in hydrogen.

After sulfiding, an oil feedstock blend of virgin distillate and light cycle oil fractions with a 27° API gravity and distillation end point of 350° C. is run through the reactor at 330° C. and 500 psig at weight hourly space velocity of 5 with hydrogen at a flow rate of 500 SCF/BBL. Sulfur in the feedstock was reduced from 1.4% by wt to 0.40% by wt in a single pass through the reactor.

EXAMPLE 5

A stainless steel cylindrical rocking autoclave reactor having 285 cc capacity and equipped with inlet port and thermowell is charged with 150 grams of residual oil and 2 grams of the bead catalyst prepared as described in Example 4 above. This catalyst has surface area 150 m$^2$/g, total pore volume 0.86 ml/g macropore volume 0.57 ml/g, and the size is 20-40 mesh. The reactor is flushed with hydrogen to remove air and then pressurized with hydrogen to 750 psi. The reactor is heated over about two hours to 380° C. operating temperature and the pressure increases to 1500 psi, at which it is then controlled. When the reactor temperature reaches 380° the gases in the reactor are purged by venting to reduce pressure inside to 500 psi. The pressure is then restored to 1500 psi with hydrogen. The reactor is maintained at 380° C. and rocked continuously in a 60° arc at a frequency about 60 cycles per min. After one hour of operation at the operating temperature the gasses are again vented to 500 psi and the reactor is repressured with hydrogen as before. This is also repeated at the ends of the second, third and fourth hours. At the end of 20.5 hours operating time, the heating is stopped and the reactor is cooled in about one hour to about 200° C. and the gas is vented. The reactor is opened and the liquid contents are separated from the solids and analyzed for sulfur, metals and asphaltenes. The product analysis is shown in Table III.

The procedure just described is repeated in a series of runs except with variations in catalyst used, the residual oil treated and the reaction times for individual runs, as indicated in Table III. Control runs are made using no catalyst and using Alundum brand crystalline aluminum oxide particles of comparable size. These particles have surface area less than 10 m$^2$/gm, and pore volume less than 0.1 ml/g and size 20-40 mesh. A comparison run is made using Aero HDS 1442B brand catalyst which is a commercially available hydrodesulfurization catalyst having comparable catalytic metal content on alumina extrudate support particles. The commercial catalyst is ground to comparable size (20-40 mesh) and it has comparable total pore volume (0.85 ml/gm) but lower macropore volume (0.31 ml/g) and greater surface area (over 250 m$^2$/gm). The catalytic metals content in the Aero catalyst is 15% by wt MoO$_3$ and 3% CoO. In the bead catalysts, the catalytic metal content is 12% by wt MoO$_3$ 1.5% CoO and 1.5% NiO.

Analysis of the two Persian Gulf residual oils used in the runs (untreated) is tabulated in Table III. The Safaniya resid is a distillation residue having 13.9° API Gravity which boils at 642° F. when 20% has distilled and at 995° F. when 50% has distilled. The Kuwait resid is heavier, having 9.3° API Gravity and boiling at 793° F. when 10% has distilled and at 981° F. when 30% has distilled.

TABLE III

| Run No. | Residual Oil charged to reactors. gms. | Catalyst wt. used. gms. | Reaction time at 380° C. hours | Untreated Residual Oil and Product Analysis | | | |
|---|---|---|---|---|---|---|---|
| | | | | S % by wt. | V ppm | Ni ppm | Asphaltenes % by wt. |
| Untreated | Safaniya Resid 150 gm | Untreated | Untreated | 3.9 | 305 | 45 | 8.3 |
| 1 | Safaniya Resid 150 gm | Beads 2 gm | 20.5 | 2.5 | 24 | 2.6 | 2.6 |
| 2 | Safaniya Resid 150 gm | Aero HDS 1442B 2 gm | 19.0 | 2.4 | 19 | 0.9 | 4.4 |
| Control | Safaniya Resid 150 gm | Alundum 2 gm | 19.0 | 3.4 | — | — | — |
| Control | Safaniya Resid 150 gm | None | 20.5 | 3.5 | — | — | — |
| 3 | Safaniya Resid 150 gm | Beads 20 gm | 20.5 | 1.5 | 11 | <0.5 | — |
| 4 | Safaniya Resid 150 gm | Beads 2 gm | 3.5 | 3.3 | 299 | 42 | 9.2 |
| 5 | Safaniya Resid 150 gm | Beads 2 gm | 43.0 | 1.7 | 12 | 2 | 4.4 |
| Untreated | Kuwait Resid 250 gm | Untreated | Untreated | 4.9 | 97 | 24 | 4.7 |
| 6 | Kuwait Resid 250 gm | Beads 2 gm | 20.0 | 3.2 | 3 | 1.1 | 2.7 |
| Control | Kuwait Resid 250 gm | None | 20.5 | 4.1 | 8.5 | 3.0 | 3.3 |

Data in Table III demonstrate that the rehydrated alumina-supported bead catalyst has activity for hydrodesulfurization of residual oils that is comparable with a catalyst on extrudate alumina support of known effectiveness for that use. The bead catalyst had equal effectiveness with significantly less surface area. The beaded alumina supports have relatively higher macroporous pore volume which will permit absorption of more metals from the residual oil being treated before the catalyst is deactivated by the metals. Thus the catalyst life in continuous processing of residual oils and other feedstocks containing metals will be longer than with the known catalyst.

EXAMPLE 6

Beading slurry is prepared by suspending rehydratable alumina powder in ice water, containing about 1 part concentrated nitric acid per 100 parts alumina, as in Example 1. After leaching for one hour the slurry is filtered and washed with four displacements of deionized water. The filter cake is repulped in water to a concentration of 47% solids.

Molybdenum oxide (Amax Pure Grade L) is added to the slurry to give 6 parts by weight of $MoO_3$ per 100 parts alumina and blended in with agitation. The pH is adjusted with ammonia to 6–7. Beads are formed by dropping slurry droplets from a pipette into hot mineral oil at about 90° C., a 30:70 mixture of Sontex® 35 mineral oil and Zonarex® 7070 polyterpene resin, in which they settle slowly and are then cured overnight at 90° C. After draining the oil the beads are calcined at 650° C.

Beads are similarly prepared with silica instead of molybdenum oxide, 5 parts by wt $SiO_2$ per 100 parts alumina, and with Linde HNa-Y-1 molecular sieves as the additive, 10 parts by wt sieves per 100 parts alumina, as well as with no addition. In all cases beads of quite uniform size were prepared. Physical properties tabulated in Table IV show that strong beads with high total pore volume are produced with the additives incorporated before bead formation. Beads made similarly using from 70 to 100 parts by wt of partially dehydrated rehydratable alumina and up to 30 parts by wt of other solids, which may include other aluminas or other solid fillers can be made by the methods described herein.

TABLE IV

| Additive | Bead Diameter mm | Total Pore Volume ml/g | Crush Strength lb |
|---|---|---|---|
| None | 4.3 | 1.0 | 10 |
| Molybdenum Oxide | 4.3 | 1.0 | 10 |
| Silica | 4.3 | 1.1 | 12 |
| Molecular Sieves | 4.8 | 1.0 | 39 |

In the foregoing description and in the claims the term "spherical" is used to define the shapes that are formed by surface tension forces in the two-phase fluid system. The term includes shapes which may vary from true spheres, such as tear-drop shapes, flattened spheres, etc.

In a variation of the bead-forming method described herein, the slurry droplets may be dispersed in low melting hot paraffin wax, liquefied, the same as in other water immiscible oils; the paraffin is then cooled to a reduced temperature at which the paraffin hardens enough to hold the droplets in suspension indefinitely. In this state, the droplets are held to shape for time sufficient for hardening by rehydration, which will be slower at the reduced temperature. To remove the hardened beads, the paraffin is again heated and separated by filtration.

In addition to rehydratable alumina, other aluminas in aqueous dispersion can be formed into spherical beads by the process of the invention. There are several known kinds of alumina which in aqueous dispersion will have the properties that make them suitable for use in the present invention. The aqueous alumina slurry (the term slurry in this use includes sols or other dispersions of alumina in water) must be dispersible into droplets by agitation with water-immiscible liquid and must be sufficiently fluid so that the droplets can be shaped into beads by interfacial surface tension in an oil bath. Further the alumina must be capable of being hardened in the bath sufficiently to hold the particle shape that is formed in the bath and so that the particles will not aggregate and stick together in the bath or after they are removed from the bath.

In some aqueous dispersions of non-rehydratable aluminas, these properties can be achieved, for example, by adding a base to bring the pH of the aqueous dispersion into the range about pH4 to 7 at which the alumina will undergo thickening and solidification. The basic reagent may be added by using an ammoniated oil bath from which the droplets will absorb basic ammonia as they are dispersed in the oil or the base may be generated by means of a compound added to the aqueous slurry which will decompose in the heat of the bath to release a base, e.g. hexamethylene tetramine.

U.S. Pat. No. 4,179,408 described a method of forming spherical particles from alumina slurry droplets which are dropped into a bath of water-immiscible liquid and which are shaped and set in the water-immiscible bath, as the droplets descend through the bath which contains ammonia. The shaped and set particles are then further hardened in aqueous alkaline bath. The present invention can be used instead of the oil drop method to disperse droplets of the same aqueous alumina slurry in a continuous phase of the same ammoniated oil. This dispersion is droplets will be shaped and set as they settle from the dispersion. The aqueous alumina droplets are dispersed by feeding the alumina slurry and the water immiscible liquid (kerosene) together to an in-line mixer to distribute the aqueous phase as a disperse aqueous phase (droplets) in the immiscible liquid as a continuous phase. This dispersion flows immediately into an ammoniated kerosene bath in which the droplets gradually settle downward. The kerosene may be ammoniated either in the bath or preferably before it is fed to the mixer.

U.S. Pat. No. 4,250,058 described still another method of making spherical alumina particles by an oil drop method. Alumina hydrogel, containing an ammonia precursor which upon heating will hydrolyze or decompose to ammonia, was prepared in a slurry and dispersed by dropping from a nozzle as droplets into an oil bath, heated to temperature about 95° to 100° C. At this temperature the ammonia precursor reacts to release ammonia which raises the pH of the droplet causing it to harden while it is still in the oil bath. Instead of dispersing those droplets in an oil bath by dropping the slurry from a nozzle, the present invention disperses the alumina slurry droplets into the oil by means of an agitating mixer.

EXAMPLE 7

An alumina sol is prepared by digesting alumina pellets in dilute hydrochloric acid at 102° C. The sol is cooled and combined with hexamethylene tetramine solution to make a heat-curable alumina hydrosol containing about 12 wt % hexamethylene tetramine and about eight wt % aluminum. This hydrosol is dispersed as droplets in kerosene by combining a stream of the slurry with a stream of oil and feeding the mixture through a static in-line mixer. The ratio of slurry to oil is 1 to 10 volume/volume. The flow rate through the mixer is adjusted to make beads of about 500 micron diameter, at 5 gallons per minute through a 1 inch diameter, 18 element Kenics mixer. No significant gellation takes place before the dispersion leaves the mixer. The dispersion of aqueous droplets in oil is fed to an oil-filled forming tower maintained at about 95° C. at which temperature gellation of the droplets to beads is induced by decomposition of the tetramine to ammonia. The beads are further aged for 19 hours in oil at 100° C. followed by a 15 minute aging is buffered ammonium chloride solution at 95° C. and finally in aqueous ammonia for 7 hours. The beads are dried and calcined at 650° C. in air for two hours. The spherical beads are ready for use.

We claim:

1. Hydrotreating catalyst comprising at least one catalytic metal selected from group VI and, optionally, at least one promoter metal selected from Group VIII of the periodic table, on catalyst support particles consisting essentially of spherical alumina beads consisting essentially of 70 to 100% by wt of alumina that has been rehydrated from partially dehydrated alumina in the forming of said beads and has then been calcined to convert the alumina to essentially anhydrous alumina, said beads having average particle diameter in the range from about 0.1 to 1 mm, and total pore volume in the range from 0.75 to 1.3 ml/gm with 0.3 to 0.6 ml/gm of said pore volume in pores having radius less than 105 Angstroms.

2. Hydrotreating catalyst defined by claim 1 wherein the defined catalytic metal is molybdenum and said promoter metal is selected from cobalt and nickel or both.

3. Hydrotreating catalyst defined by claim 1 wherein the defined spherical alumina beads have average particle diameter less than 1 mm.

4. Hydrotreating catalyst defined by claim 1 wherein the defined beads are of particle size 20–40 mesh.

5. A process for hydrotreating hydrocarbon liquids comprising contacting said liquids with hydrogen in presence of a catalyst defined by claim 1 under hydrotreating conditions for removal of sulfur compounds, nitrogen compounds or metals or for conversion of heavy hydrocarbon components of said liquid to lighter hydrocarbon components, or any combination thereof.

6. A process defined by claim 5 wherein the defined contacting is carried out in an ebullated bed of the defined catalyst particles.

7. A process defined by claim 5 wherein the hydrocarbon liquid treated is heavy residual oil.

8. A process defined by claim 5 wherein the hydrocarbon liquid treated is oil derived from coal.

9. A process defined by claim 5 wherein the hydrocarbon liquid treated is oil derived from shale.

10. A process defined by claim 5 wherein the hydrocarbon liquid treated is oil derived from tar sands.

11. A method of making spherical alumina beads defined by claim 1 said method comprising feeding one part by volume of an aqueous slurry containing 40 to 60 percent by wt of finely divided solids which comprise 70 to 100 percent by wt of said solids of partially dehydrated rehydratable alumina powder, and at least two parts by volume of a water immiscible liquid to an agitating mixer and agitating the mixed feed with sufficient agitation to disperse said aqueous slurry as a discontinuous phase of aqueous slurry droplets in a continuous phase of said water immiscible liquid, and heating the dispersed droplets in said dispersion sufficiently to cause at least partial rehydration and hardening of the rehydratable alumina in said dispersed droplets as said droplets are shaped to spherical beads by interfacial surface tension forces in the dispersion, curing said beads with heat sufficient for rehydration of said alumina, either in said dispersion or in a separate contact with steam or water, to complete the rehydration of said alumina and calcining the rehydrated alumina beads to convert the alumina to essentially anhydrous alumina.

12. A method defined by claim 11 wherein the degree of agitation applied to the defined combined liquids is selected to form beads as defined having average bead diameter in the range from 0.1 to one millimeter.

13. A method defined by claim 11 wherein the aqueous slurry droplets are dispersed in the oil phase by an in-line motionless mixer.

14. Hydrotreating catalyst comprising at least one catalytic metal selected from Group VI and, optionally, at least one promoter metal selected from Group VIII of the periodic table, on catalyst support particles consisting of spherical alumina beads made by the method defined by claim 11.

15. A process for hydrotreating hydrocarbon liquids comprising contacting said liquids with hydrogen in presence of a catalyst defined by claim 14 under hydrotreating conditions for removal of sulfur compounds or nitrogen compounds or metals or for conversion of heavy hydrocarbon components of said liquid to lighter hydrocarbon components, or any combination thereof.

16. Hydrotreating catalyst comprising at least one catalytic metal selected from Group VI and, optionally, at least one promoter metal selected from Group VIII of the periodic table, on catalyst support particles consisting of spherical alumina beads made by the method defined by claim 12.

17. A process for hydrotreating hydrocarbon liquids comprising contacting said liquids with hydrogen in presence of a catalyst defined by claim 16 under hydrotreating conditions for removal of sulfur compounds or nitrogen compounds or metals or for conversion of heavy hydrocarbon components of said liquid to lighter hydrocarbon components, or any combination thereof.

18. Hydrotreating catalyst comprising at least one catalytic metal selected from Group VI and, optionally, at least one promoter metal selected from Group VIII of the periodic table, on catalyst support particles consisting of spherical alumina beads made by the method defined by claim 13.

19. A process for hydrotreating hydrocarbon liquids comprising contacting said liquids with hydrogen in presence of a catalyst defined by claim 18 under hydrotreating conditions for removal of sulfur compounds or nitrogen compounds or metals or for conversion of heavy hydrocarbon components of said liquid to lighter hydrocarbon components, or any combination thereof.

20. In a method of making spherical alumina beads comprising dispersing droplets of an aqueous slurry of alumina in a continuous phase of water-immiscible liquid and forming the droplets into spherical shaped alumina beads while dispersed in said continuous phase and sufficiently hardening said beads, while they are dispersed in said continuous phase sufficiently so that the beads will hold the spherical shape when removed from said water-immiscible liquid, the improvement wherein said dispersion of droplets is formed by feeding aqueous slurry of alumina and a water-immiscible liquid together to an agitating mixer and agitating the mixed feed with sufficient agitation to disperse the aqueous slurry as a discontinuous phase of aqueous slurry droplets in a continuous phase of the water-immiscible liquid.

21. An improved method defined by claim 20 wherein the defined agitating mixer is an in-line mixer having opposed stators inside a tube and wherein a mixed stream of the immiscible liquids is fed through said in-line mixer with sufficient velocity to disperse the aqueous slurry in the water-immiscible phase upon agitation of the stream by the stators inside said tube.

22. An improved method defined by claim 21 wherein the droplets of aqueous alumina slurry, while shaped into spherical beads in the water-immiscible continuous liquid phase, are hardened to said shape by heat.

23. An improved method defined by claim 21 wherein the droplets of aqueous alumina slurry, while shaped into spherical shape in the water-immiscible liquid, are hardened to said shape by ammonia in the water-immiscible liquid phase.

24. An improved method defined by claim 21 wherein the proportion of water-immiscible liquid to aqueous slurry of alumina and water-immiscible liquid fed to the defined agitating mixer is at least two volumes of water-immiscible liquid to one volume of aqueous alumina slurry.

25. An improved method defined by claim 24 wherein the defined proportion is in the range from 5 to 20 volumes to one.

* * * * *